(No Model.) 2 Sheets—Sheet 1.
F. S. VIELÉ.
ERECTING AERIAL ELECTRIC CABLES.
No. 581,242. Patented Apr. 20, 1897.
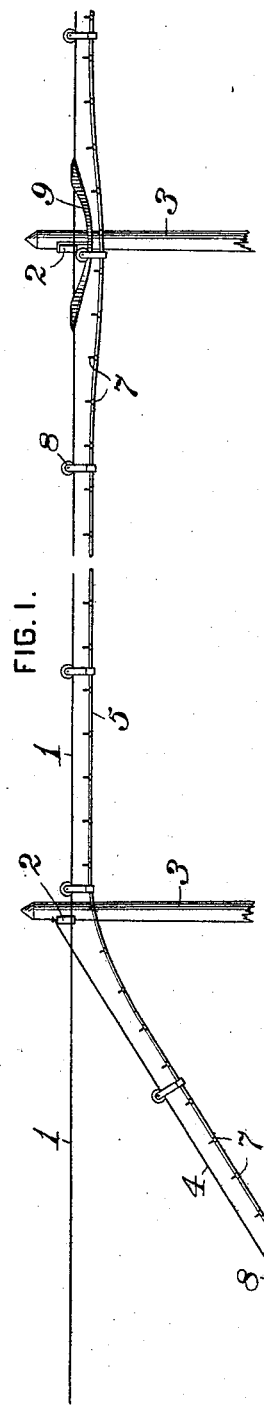
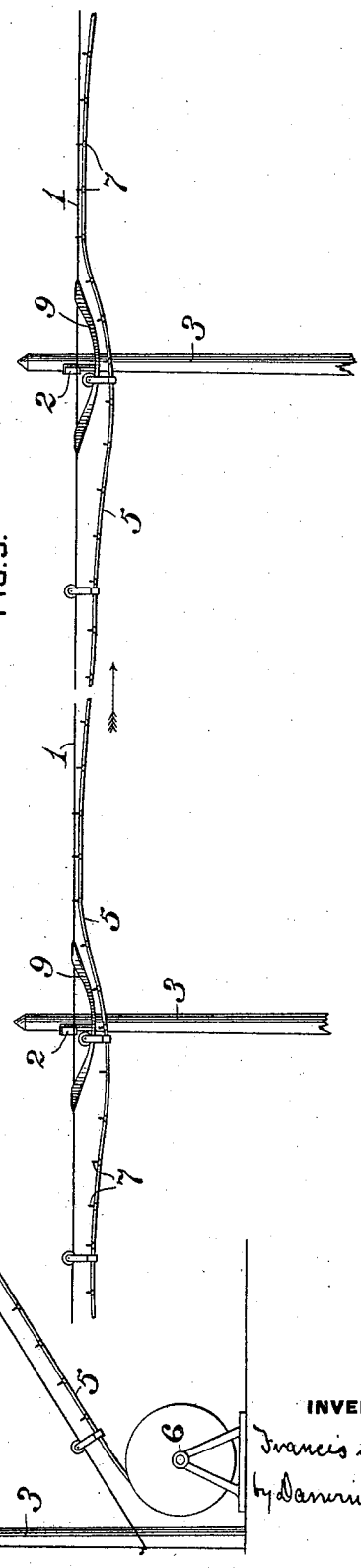
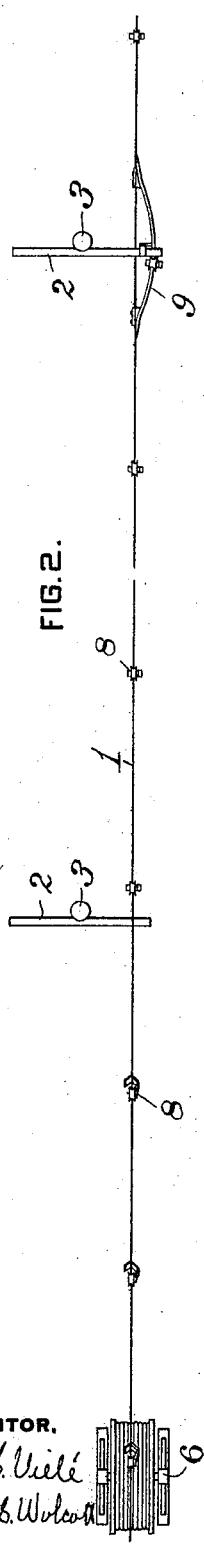
WITNESSES: INVENTOR, (No Model.) 2 Sheets—Sheet 2.
F. S. VIELÉ.
ERECTING AERIAL ELECTRIC CABLES.
No. 581,242. Patented Apr. 20, 1897.
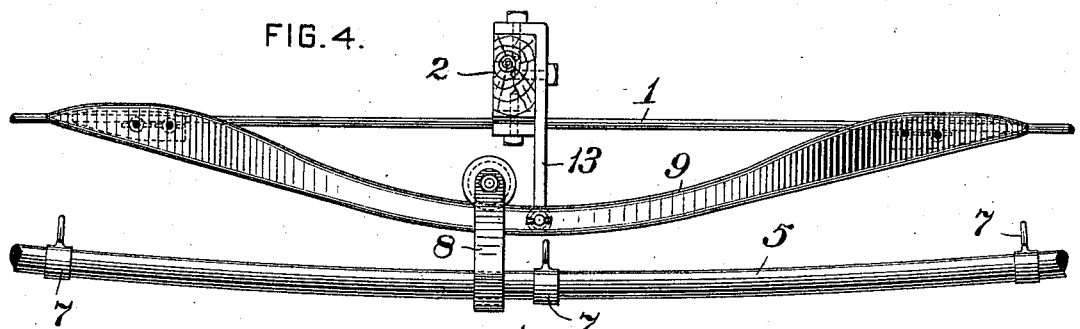
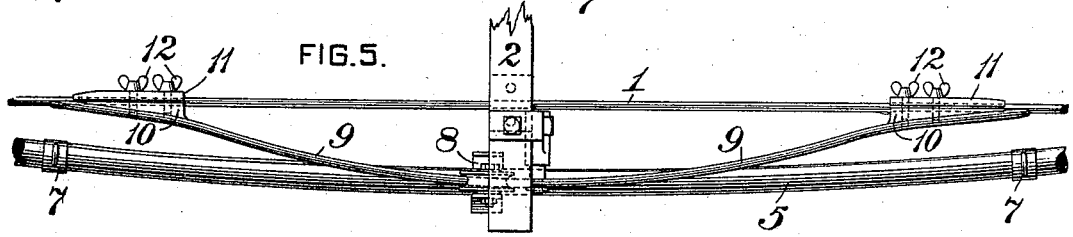
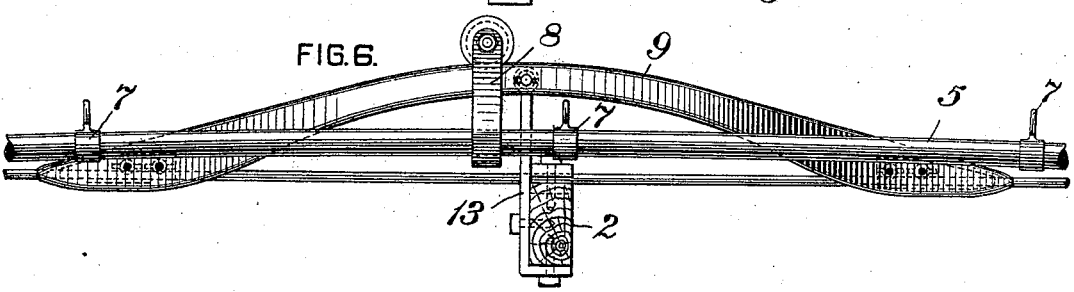
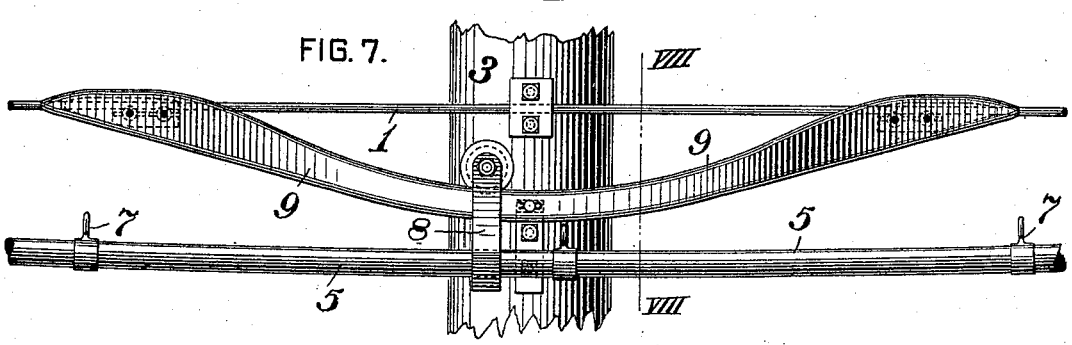
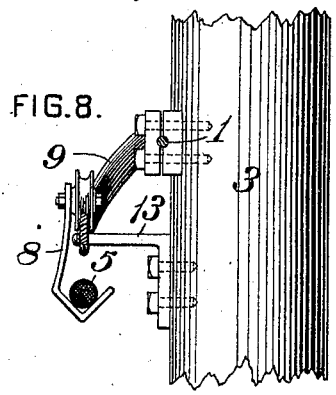
WITNESSES:
Chas. F. Miller.
F. E. Gaither.
INVENTOR.
Francis S. Vielé
by Damon S. Wolcott
Att'y.

UNITED STATES PATENT OFFICE.

FRANCIS S. VIELÉ, OF PITTSBURG, PENNSYLVANIA, ASSIGNOR TO THE STANDARD UNDERGROUND CABLE COMPANY, OF SAME PLACE.

ERECTING AERIAL ELECTRIC CABLES.

SPECIFICATION forming part of Letters Patent No. 581,242, dated April 20, 1897.

Application filed November 12, 1896. Serial No. 611,845. (No model.)

*To all whom it may concern:*

Be it known that I, FRANCIS S. VIELÉ, a citizen of the United States, residing at Pittsburg, in the county of Allegheny and State of Pennsylvania, have invented or discovered certain new and useful Improvements in Erecting Aerial Electric Cables, of which improvements the following is a specification.

In erecting aerial electric cables a strong wire, usually termed the "messenger-wire," is suspended from the poles or cross-arms, and a wire, which for convenience will be termed the "feed-wire," is stretched from the cross-arm of one pole to the foot of the next pole. A reel containing the cable is placed at the lower end of the feed-wire and a rope connected to one end of the cable and passing over the cross-arm to which the upper end of the feed-wire is attached is employed for pulling the cable up the feed-wire and along the messenger-wire.

It has heretofore been customary to clamp the double hooks or supporting-clips to the cable as it comes from the reel and to place the hook at the opposite ends of the clip onto the feed-wire. A man is placed on each pole for the purpose of disengaging the clips from the feed and messenger wires, passing them around the device employed for securing the messenger-wire to the poles or cross-arms, and hooking them onto the messenger-wire again. As these clips are usually arranged from eighteen to twenty-four inches apart on the cable, the onward movement of the cable must be checked after each movement of eighteen inches to permit the transfer of the clips around the messenger-wire holders. This method of erecting the cables is very slow and laborious on account of the frequent lifting of the cable, as described, and also the frictional resistance of the numerous clips on the messenger-wire requiring a large number of men to pull the cable along in addition to the men on the poles for shifting the clips.

The object of the present invention is to provide for the stringing of the cable by temporary supports on the messenger-wire and then applying the clips to the messenger-wire after the cable has reached final position or during the movement of the cable between two poles, so that when the entire length of cable has been drawn to position all the clips will have been placed in engagement with the messenger-wire.

The invention is hereinafter more fully described and claimed.

In the accompanying drawings, forming part of this specification, Figure 1 is a side elevation showing the manner of erecting aerial cables. Fig. 2 is a top plan view of the same. Fig. 3 is a view similar to Fig. 1, showing the manner of applying the permanent clips to the messenger-wire. Fig. 4 is a side elevation, on an enlarged scale, illustrating my improved switch, showing the same arranged below the cross-arm. Fig. 5 is a top plan view of the construction shown in Fig. 4. Fig. 6 is a side elevation showing the manner of supporting the switch above the cross-arm. Fig. 7 is a similar view showing the switch attached to the side of the pole; and Fig. 8 is a sectional view, the plane of section being indicated by the line 8 8, Fig. 7.

In the practice of my invention the messenger-wire 1 is secured to the cross-arms 2 or poles 3 in the usual, or any suitable manner, and a feed-wire 4 is stretched between the cross-arm 2 of one pole and the bottom of the next preceding pole 3. A rope is then passed over the cross-arms and connected to the end of the cable 5 on the reel 6, which is arranged adjacent to the pole having the lower end of the feed-wire attached thereto. As the cable is drawn by the rope from the reel, permanent clips 7 are secured thereto at intervals of about eighteen to twenty-four inches, and the cable is supported by the feed-wire at intervals of about thirty or forty feet, more or less, by means of carriers 8. These carriers consist of a grooved pulley and a hook suspended from the axle of the pulley, the hook being so shaped that the weight of the cable will be in the plane passing through the pulley midway of its width, so that the cable will hang directly under the feed or messenger wires while it is being drawn around to position. In order to pass these trolleys or carriers around the cross-arms or poles, a man may be stationed on each pole for that purpose and some suitable temporary support provided at each pole for holding the cable while such transfer of the carriers is being made. It is preferred, however, to employ a switch or turnout device at each pole, so that the carriers may pass around without interruption. Such switch or turnout device is clearly shown in Figs. 4 to 8, inclusive, and consists of a rail 9 of a thickness approximately equal to the diameter of the messenger-wire and provided at its ends with suitable clamping mechanisms, which consist of jaws 10, formed on or secured to the switch-rail 9, and jaws 11, adapted to be drawn against the jaws 10 by thumb-nuts 12, screwing on suitable bolts. These clamping mechanisms are provided on their inner faces with grooves for the reception of the messenger-wire and are so constructed and attached to the switch-rail that the ends of the latter when secured in position will be in line with the messenger-wire, as clearly shown in Fig. 5. The middle portion of the switch-rail is connected by an arm 13 to the cross-arms 2, as shown in Figs. 4 to 6, or to the pole, as shown in Figs. 7 and 8. The switch-rail is curved, as shown, so that when the messenger-wire is attached to the under sides of the cross-arms the trolleys or carriers may pass under the cross-arms, as shown in Fig. 4, or by a reversal of its position, as shown in Fig. 6, the trolleys or carriers may pass over the cross-arm when the messenger-wire is attached to the upper sides of the cross-arms. The switch-rail is also given an outward curve, as shown in Fig. 8, in order to permit of the free passage of the trolleys or carriers around the pole when the messenger-wire is secured to the side thereof, as shown in Figs. 7 and 8.

After the cable has been drawn up onto the messenger-wire and its front end is at the next to the last pole of its final position a man is stationed on each pole, and as each of the permanent clips passes beyond the end of the switch-rail it is hooked upon the messenger-wire, so that when the cable has reached its final position each one of the permanent clips will have been applied to the messenger-wire except those which come between the ends of the switches. These switches are then removed and the remaining clips hang upon the messenger-wire.

It will be readily understood from the foregoing that the cable can be quickly drawn to its approximate position, and that the only severe labor will be the hanging of the permanent clips to the messenger-wire, and that such labor is necessary during only the comparatively short movement of the cable for a distance equal to that between two poles.

I claim herein as my invention—

1. As an improvement in the art of erecting aerial cables, the method herein described, which consists in drawing the cable while supported from the messenger-wire by temporary carriers to approximate final position, and then connecting the messenger-wire and cable by permanent supports while moving the cable to final position, substantially as set forth.

2. As an improvement in the art of erecting aerial electric cables, the method herein described, which consists in stringing the cable which is suspended from the messenger-wire by temporary carriers or supports, and then connecting the cable and messenger-wire by permanent supports and removing the temporary supports, substantially as set forth.

3. As a mechanism for erecting and suspending aerial electric cables, the combination of a messenger-wire supported by suitable poles, removable carriers, and permanent suspensories for connecting the messenger-wire and cable when the latter has been drawn to, or approximately to, final position, substantially as set forth.

4. As a mechanism for erecting and suspending aerial electric cables, the combination of a messenger-wire supported by suitable poles, removable carriers, means for supporting the cable while passing the supports for the messenger-wire, and permanent suspensories for connecting the messenger-wire and cable when the latter has been drawn to, or approximately to, final position, substantially as set forth.

5. As a mechanism for erecting aerial electric cables, the combination of a curved rail and clamps adapted to secure the ends of the rail in line with the messenger-wire, substantially as set forth.

6. As a mechanism for erecting aerial electric cables, the combination of a curved rail, clamps adapted to secure the ends of the rail to the messenger-wire, and an arm adapted to be secured to the messenger-wire support, substantially as set forth.

In testimony whereof I have hereunto set my hand.

FRANCIS S. VIELÉ.

Witnesses:
DARWIN S. WOLCOTT,
F. E. GAITHER.